C. F. BRAUN.
TWIN STRAINER.
APPLICATION FILED APR. 4, 1917.

1,253,344.

Patented Jan. 15, 1918.

WITNESSES:
Charles Pickles
Julius C. Benesch

INVENTOR
Carl F. Braun.
BY Strong & Townsend
ATTORNEYS

UNITED STATES PATENT OFFICE.

CARL F. BRAUN, OF SAN FRANCISCO, CALIFORNIA.

TWIN STRAINER.

1,253,344. Specification of Letters Patent. Patented Jan. 15, 1918.

Application filed April 4, 1917. Serial No. 159,767.

*To all whom it may concern:*

Be it known that I, CARL F. BRAUN, citizen of the United States, residing at the city and county of San Francisco and State of California, have invented new and useful Improvements in Twin Strainers, of which the following is a specification.

This invention relates to twin strainers and the like, and has for its object to provide a simplified and improved means for separately controlling the same by use of but a single valve for each strainer. Twin strainers as hitherto constructed embody two separate strainers placed side by side and connected to the supply pipe which carries the liquid to be strained. Each strainer has a separate and independent valve for controlling its inlet so that either one may be cut out independently of the other to permit cleaning, both being operated simultaneously in normal use. In the present invention, I employ a manifold for connecting both strainers to the supply pipe and make use of a single valve for controlling both strainers. This comprises a seat in each branch of the manifold with a disk valve positioned between and having its stem extending centrally through the branch of the manifold and operative to move the valve into engagement with either seat for cutting out the strainer communicating with that branch of the manifold.

One form which my invention may assume is exemplified in the following description and illustrated in the accompanying drawing, in which—

Figure 1:
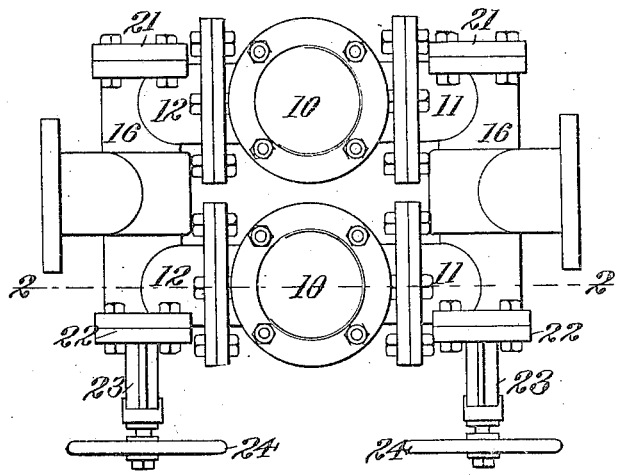
Figure 1 shows a plan view of a twin strainer set embodying my invention.
Figure 2:
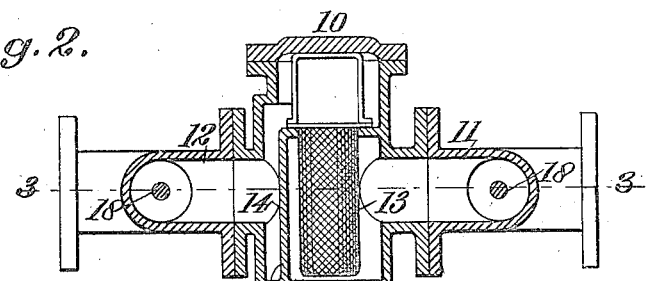
Fig. 2 shows a sectional view taken on the line 2—2 of Fig. 1.
Figure 3:
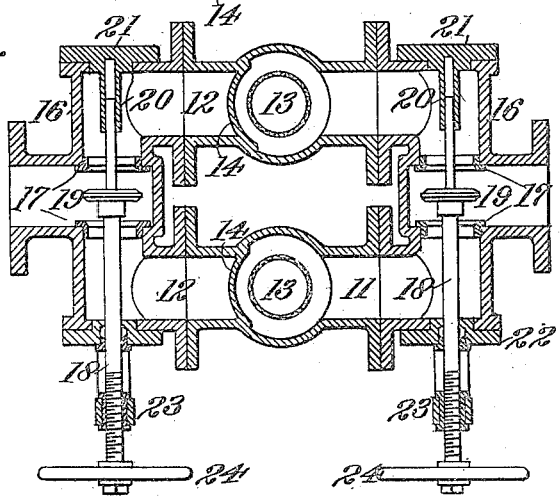
Fig. 3 shows a sectional view taken on the line 3—3 of Fig. 2.

In the drawings I show twin strainers 10 arranged side by side, each with an inlet 11 and an outlet 12. The interior of the strainers may be of any suitable form, and as here shown comprises a cylindrical screen 13 carried removably in an angular partition 14, the liquid to be strained being compelled to pass through this screen to reach the outlet.

Either the inlets or outlets or both of the two strainers are connected to the main conduit by a T-shaped manifold 16 at either side of the stem of which is a valve seat 17. Passing centrally through the branches of the manifold is a valve stem 18 carrying a disk valve 19 positioned between the seats 17 and adapted to engage with either when the stem is manipulated. The stem at one end enters a guide 20 formed on a head 21 fitted removably in the adjacent end of the branch, and at the other end passes through a removable head 22 on the branch and is received in a yoke 23 fitted on said removable head 22, which yoke forms a screw-threaded seat for the stem, the hand wheel 24 being provided at this end to manipulate the stem.

Normally the valve 19 is disposed midway between the seats 17 in line with the stem of the manifold and therefore offers no obstruction to the passage of liquid through the manifold. In fact the resistance to flow offered by the disk valve is negligible when in mid position on account of its edgewise disposition. When, however, it is desired to cut out either one of the strainers for the purpose of removing and cleaning it, the valve is moved to close the branch communicating therewith, leaving the other branch in use. The fact that the valve seats against the front faces of the seats in both cases affords a tighter fit, inasmuch as when the disk is screwed against the seat, the pressure of the liquid being in the same direction tends to force the disk into closer engagement. By having a manifold connection on both sides of the strainer, each with a by-pass valve as described, one strainer may be removed entirely when both valves are closed to that side without interrupting the service. The removable heads 21 and 22 of the manifolds permit access for repairing the valves and renewal of the seats and disks.

Various changes in the construction and arrangement of the several parts herein shown and described may be employed without departing from the spirit of my invention as disclosed in the appended claim.

Having described my invention, what I claim and desire to secure by Letters Patent is:

In a device of the type set forth, a pair of side conduits, a pair of end conduits connected at their ends to the respective ends of the side conduits, each end conduit having a substantially central opening and having a pair of valve seats at the respective opposite sides of the openings, a pair of oppositely arranged removable heads borne by each of the end conduits in alinement with the respective end conduits, a pair of valve stems movably guided by the respective pairs of heads, a valve on each stem engageable with each of the valve seats of the respective end conduits, and a removable element borne by each side conduit between the ends thereof to enable access thereto.

In testimony whereof I have hereunto set my hand in the presence of a subscribing witness.

CARL F. BRAUN.

Witness:
GEORGE T. TROWBRIDGE.

Copies of this patent may be obtained for five cents each, by addressing the "Commissioner of Patents, Washington, D. C."